(12) United States Patent
Kurichiyath et al.

(10) Patent No.: US 8,041,692 B2
(45) Date of Patent: Oct. 18, 2011

(54) SYSTEM AND METHOD FOR PROCESSING CONCURRENT FILE SYSTEM WRITE REQUESTS

(75) Inventors: Sudheer Kurichiyath, Bangalore (IN); Madhusudhana Reddy Dugasani, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 12/099,643

(22) Filed: Apr. 8, 2008

(65) Prior Publication Data

US 2008/0263043 A1    Oct. 23, 2008

(30) Foreign Application Priority Data

Apr. 9, 2007   (IN) .............................. 745/CHE/2007

(51) Int. Cl.
*G06F 17/30* (2006.01)
(52) U.S. Cl. ...................................................... 707/704
(58) Field of Classification Search .................. 707/687, 707/704, 999.008; 726/21, 4
See application file for complete search history.

(56) References Cited

U.S. PATENT DOCUMENTS

| | | | | |
|---|---|---|---|---|
| 5,544,345 | A * | 8/1996 | Carpenter et al. ............ | 711/150 |
| 5,727,206 | A * | 3/1998 | Fish et al. ............... | 1/1 |
| 5,828,876 | A * | 10/1998 | Fish et al. ............... | 1/1 |
| 7,103,616 | B1* | 9/2006 | Harmer et al. .......... | 1/1 |
| 7,743,111 | B2* | 6/2010 | Soltis ....................... | 709/217 |
| 7,933,881 | B2* | 4/2011 | Richey et al. .............. | 707/704 |
| 2005/0039049 | A1* | 2/2005 | Chang et al. .............. | 713/201 |
| 2005/0044311 | A1 | 2/2005 | Lahiri et al. | |
| 2005/0071336 | A1* | 3/2005 | Najork et al. ........... | 707/8 |
| 2006/0004885 | A1 | 1/2006 | Lubashev et al. | |
| 2007/0219999 | A1* | 9/2007 | Richey et al. .......... | 707/8 |

* cited by examiner

*Primary Examiner* — Jean M Corrielus

(57) ABSTRACT

A method for processing concurrent write operations in a computer system, the method comprising a first step of copying data residing in one or more source buffers to a contiguous intermediate buffer, prior to acquiring a lock for a write operation. In a second step, on acquiring the lock performing a translation operation between the intermediate buffer and a destination buffer, to process the write operation.

22 Claims, 6 Drawing Sheets

```
Children see throughput for  1 initial writers   =   14298.64 KB/sec
Parent sees throughput for   1 initial writers   =   14298.57 KB/sec
Min throughput per process                       =   14298.64 KB/sec
Max throughput per process                       =   14298.64 KB/sec
Avg throughput per process                       =   14298.64 KB/sec
Min xfer                                         = 2097152.00 KB iozone test complete.

real    4:58.05
user       0.12
```

Fig. 6a (Prior Art Throughput)

```
sys       16.32
```

Moving copying of buffers out of file system layer:

```
Children see throughput for  1 initial writers   =   46828.90 KB/sec
Parent sees throughput for   1 initial writers   =   46822.35 KB/sec
Min throughput per process                       =   46828.90 KB/sec
Max throughput per process                       =   46828.90 KB/sec
Avg throughput per process                       =   46828.90 KB/sec
Min xfer                                         = 2097152.00 KB iozone test complete.

real    2:11.66
user       0.11
sys       15.68
```

Fig. 6b

SYSTEM AND METHOD FOR PROCESSING CONCURRENT FILE SYSTEM WRITE REQUESTS

RELATED APPLICATIONS

This patent application claims priority to Indian patent application serial no. 745/CHE/2007, titled "System and Method for Processing Concurrent File System Write Requests", filed on 9 Apr. 2007 in India, commonly assigned herewith, and hereby incorporated by reference.

BACKGROUND OF THE INVENTION

In modern computing systems, concurrent file system write operations to a file system are serialised to avoid multiple disk block allocation and to ensure that the correct ordering of writes is adhered to (by applications, etc). In other words, serialising write operations ensures that the integrity of the file system is not compromised.

The most common way to implement serialised operation is to employ a locking mechanism which stipulates that processes must obtain a "lock" for a particular block of memory, in order to access that block of memory for writing. In the context of UNIX operating systems, for example, the lock is known as "inode lock" which imposes the write serialisation at a file level.

Inode lock operates on the basis that each file (which may be spread across a number of disk blocks) has a data structure associated with it, called an inode. The inode contains all of the information necessary to allow a process to access the file (e.g. for read/write) including, pointers to the disk blocks that store the file's contents, access mode permissions, file type, user and group ownership etc. In order for a process to change the contents of an inode, an inode lock must be acquired, thereby preventing other processes from accessing the inode while it is in a potentially inconsistent state. The inode lock is released only after the process has finished altering the inode. For a write operation, for example, inode lock is released only after the data has been copied from the various disk blocks (i.e. source buffers) to the file system buffer, and the associated inode data updated.

When implementing inode lock for large files the time in which inode lock is held by the process may be quite long.

BRIEF DESCRIPTION OF THE DRAWINGS

In order that the invention may be more clearly ascertained, embodiments will now be described, by way of example, with reference to the accompanying to drawings, in which;

FIGS. 6a and 6b are tables showing throughput performance for the server of FIG. 2, implementing both a conventional processing of concurrent writes and a processing method in accordance with an embodiment of the present invention.

DETAILED DESCRIPTION OF THE EMBODIMENTS

There will be provided a system and method for processing concurrent write operations in a computing system.

In one embodiment, the method comprises a first step of copying data residing in one or more source buffers to a contiguous intermediate buffer, prior to acquiring a lock for a write operation. In a second step, on acquiring the lock a translation operation is performed between the intermediate buffer and a destination buffer, to process the write operation.

In the context of the specification, the phrase "lock for a write operation" is to include within its scope any "per-file" locking mechanism implemented by a file system that allows for serialised write operations to the file. For example, the lock for a write operation may include the inode lock implemented by the UNIX operating system.

Furthermore, it is to be understood that the phrase "translation operation" includes within its scope any page trading or address mapping-type operation for exchanging physical pages between the intermediate buffer and destination buffer.

Figure 1:
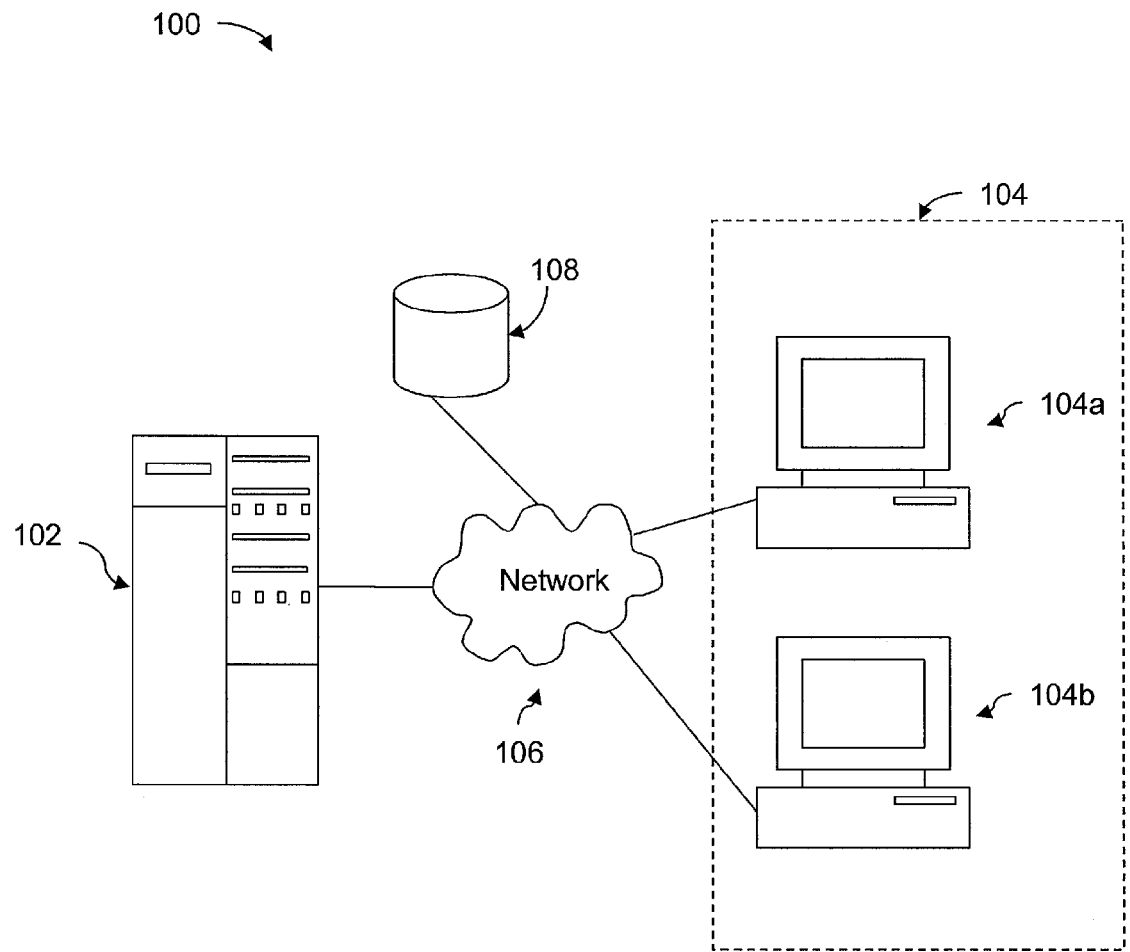
FIG. 1 is a schematic view of a computing system according to an embodiment of the present invention.

There will also be provided a computing system, such as the client-server computing system 100 illustrated in FIG. 1, which is configured to implement the above-mentioned method. In one embodiment, the client-server computing system 100 comprises a server 102 connected to clients 104 via a network in the form of the Internet 106. Clients 104 are in the form of personal computing devices 104a, 104b comprising standard hardware and software for communicating with the server 102. The clients 104 communicate with the server 102 using the Transmission Control Protocol/Internet Protocol (TCP/IP) suite of protocols. A storage device 108 is also connected to the network 106.

Figure 2:
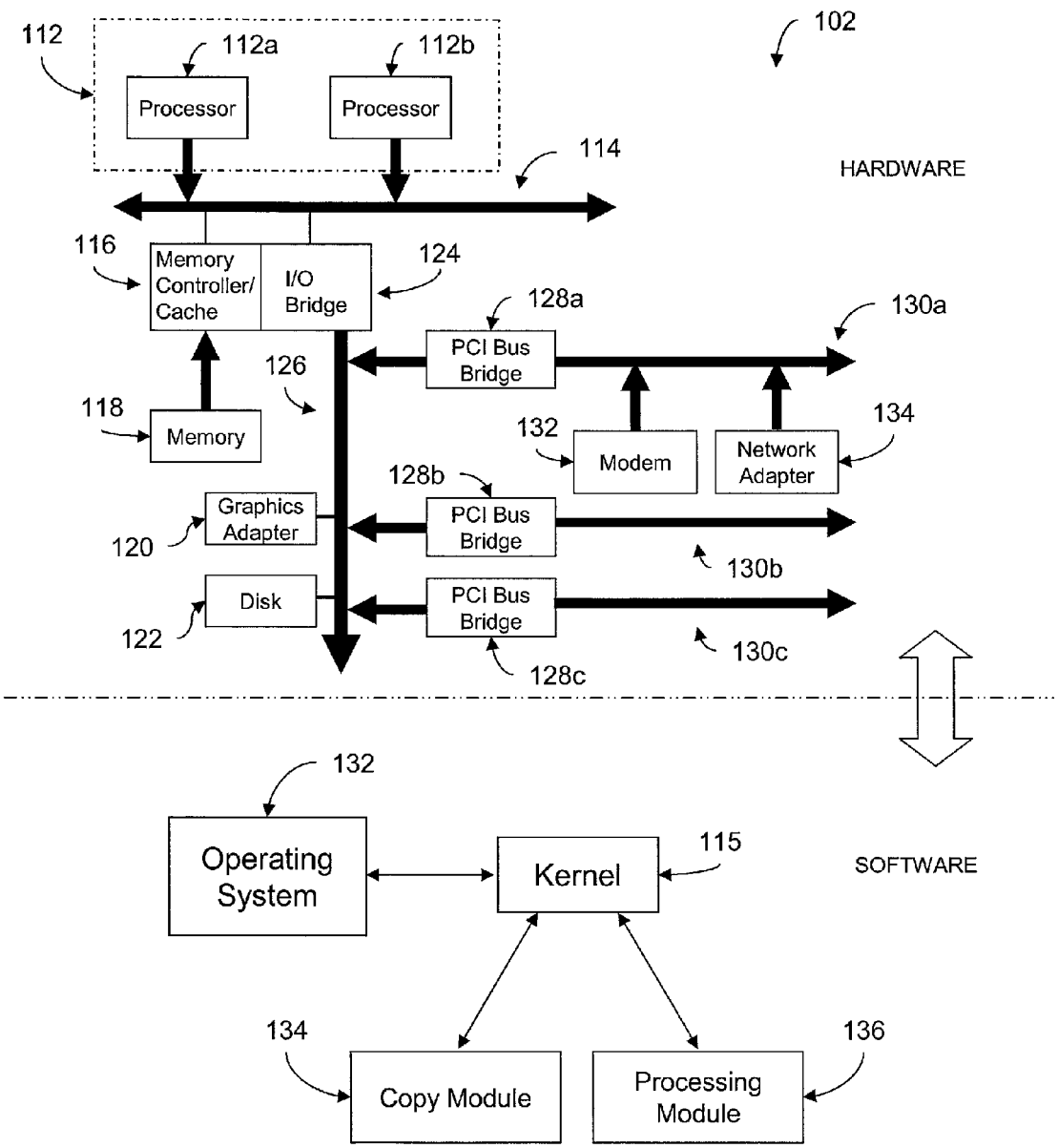
FIG. 2 is a block diagram showing the internal components of a server, in which embodiments of the present invention may be implemented.

With reference to FIG. 2, there is shown a block diagram of the hardware and software for the server 102, which in accordance with this embodiment is in the form of a HP-UX rx5670 server available from the Hewlett Packard Company. The server 102 runs an operating system in the form of a UNIX operating system 132 with a UNIX stack. It should be noted that, although in this embodiment the server 102 implements a UNIX operating system 132, other embodiments may include different operating systems such as, for example, the LINUX operating system. The UNIX operating system also includes a file system having software for controlling the transfer of data between the network 106 and hard disk 122. A buffer cache composed of part of memory 118 is used as a buffer for this data transfer. The buffer cache is also arranged to hold contents of disk blocks for the purpose of reducing frequent high latency disk I/Os.

The software also includes a kernel program 115 which is arranged, amongst other tasks, to maintain the buffer cache. The kernel program 115 separates control information (file access and synchronization protocols) from the underlying data stream. The kernel program 115 also includes a task scheduler, frameworks for writing device drivers, and various system services including kernel interfaces to memory management, timers, synchronization, and task creation. A copy module 134 and processing module 136 interact with the kernel program 115 to carrying out copy and processing operations in accordance with one embodiment of the invention, as will be described in more detail in subsequent paragraphs. It should be noted that the two modules 134, 136 may either be integral to operating system 132 or operate as independent modules and may be implemented in hardware and/or software.

The server 102 further includes a number of processors 112 in the form of quad Intel Itanium 2 processors 112a, 112b (available from the Intel Corporation of The United States of America, http://www.intel.com) coupled to a system bus 114. A memory controller/cache 116 is also coupled to the system bus 114 and is arranged to interface the memory 118, which is in the form of double data rate DDR SDRAM. Also provided is a graphics adapter 120 for handling high speed graphic addressing and an ATA gigabyte hard disk 122 which are connected to an I/O bus bridge 124, by way of an I/O bus 126. The memory controller 116 and I/O bus bridge may be interconnected, as shown in FIG. 2.

Connected to the I/O bus 126 are PCI bus bridges 128a, 128b, 128c, which provide an interface to devices connected to the server 102 via PCI buses 130a, 130b, 130c. A modem 132 and network adapter 134 are coupled to PCI bus 130a. The network adapter 134 is configured to allow the server 102 to exchange data with clients 104 using the TCP/IP protocol. As will be appreciated by person skilled in the art, additional I/O devices such as a CD-ROM, may also be coupled to the server 102 via I/O busses 130a, 130b, 130c.

As has previously been described, embodiments of the present invention provide a method and apparatus for processing concurrent write operations to the file system. In contrast to conventional techniques for carrying out concurrent write operations, buffered data waiting to be written to file is copied to a contiguous intermediate buffer in an upper file level, prior to acquiring lock for a write operation. In this manner the potentially lengthy operation of copying data byte by byte from the source buffers to cache is advanced, thereby allowing the inode lock to be released faster and consequently improving the throughput of the file system I/O.

Figure 3:
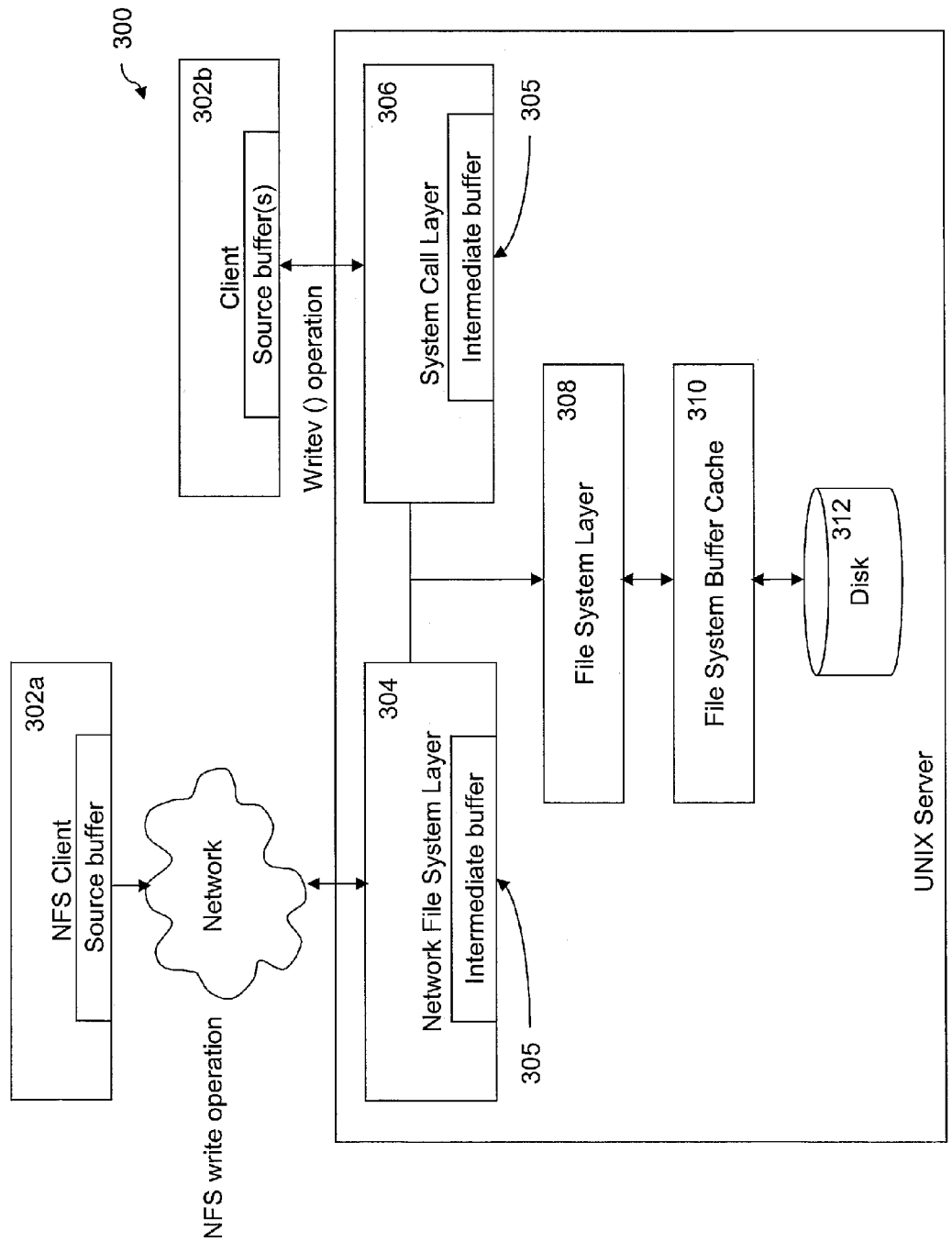
FIG. 3 is a block diagram showing a process flow at system layer level, for a method in accordance with an embodiment of the present invention.

FIG. 3 is a layer level process flow diagram showing how two different types of write operation are processed, in accordance with an embodiment of the invention. For network file system write operations, e.g. where data has been sent by an NFS client 302a over the network 106, the contiguous intermediate buffer 305 is created in the network file system layer 304 before being passed to the file system layer 308. In a "writev( )" system call operation, which is utilised to write the contents of several different buffers in a single atomic write, the intermediate buffer 305 is created in the system call layer 306. In both cases, however, the intermediate buffer 305 is being created in an upper file system layer of the UNIX server and the copy operation carried out prior to acquiring lock.

Figure 4:
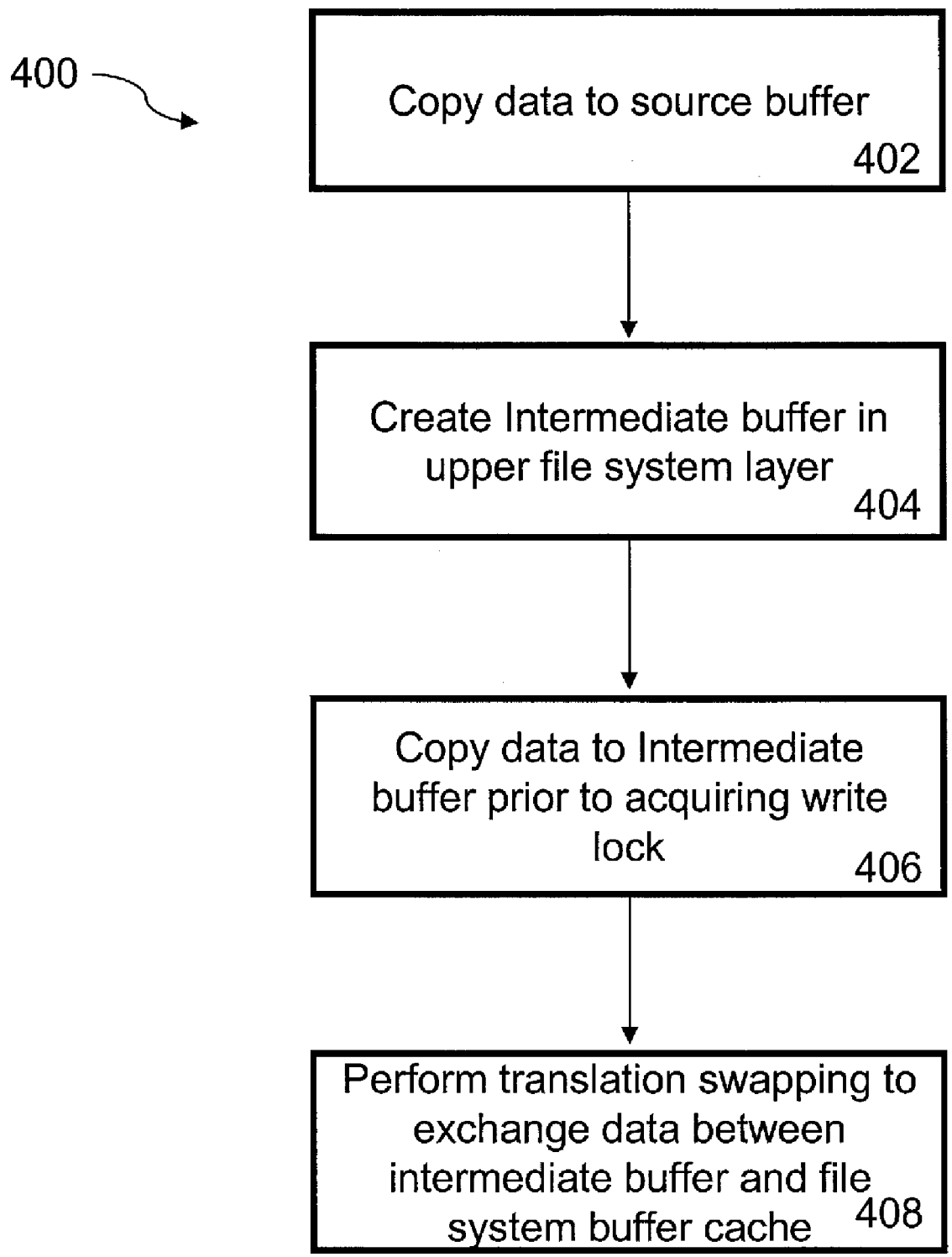
FIG. 4 is a flow diagram of the method for processing concurrent write requests according to an embodiment of the present invention.

With reference to the FIGS. 3 and 4, a method for processing concurrent write operations in accordance with an embodiment of the present invention will now be described. As discussed in previous paragraphs, the method is preferably implemented in a computing system (server, client etc) which includes a mechanism for serialising write operations, such as the inode lock which is provided in UNIX operating systems.

The method begins at step 402, where data for writing to file is copied to one or more source buffers, at an application layer 302. The buffering of data may occur, for example, in response to an application placing a writev (call to transfer data to a currently locked file. Alternatively, the data may have been received from the network in NFS layer (e.g. from a NFS client 302a) and fragmented into small portions of memory across multiple buffers.

At step 404, an intermediate buffer in the form of a single contiguous block of memory 305 is created in an upper file system layer, prior to acquiring inode lock. As has previously been discussed, the intermediate buffer 305 may be created in any number of different upper file system layers, determined only by the type of write operation that is taking place. In the embodiment described herein, a network file system layer 304 is used to create the intermediate buffer 305 for a network file system write operation, whereas for a writev ( )operation the system call layer is utilised.

The intermediate buffer 305 is created such that it is large enough to accommodate all of the data which resides in the source buffer(s) and is page aligned to ensure that a page trading/translation swapping operation with the file system buffer cache 310 can be implemented, once lock has been acquired. At step 406, the data stored in the source buffer(s) is copied to the intermediate buffer 305 by the copy module 134.

Figure 5:
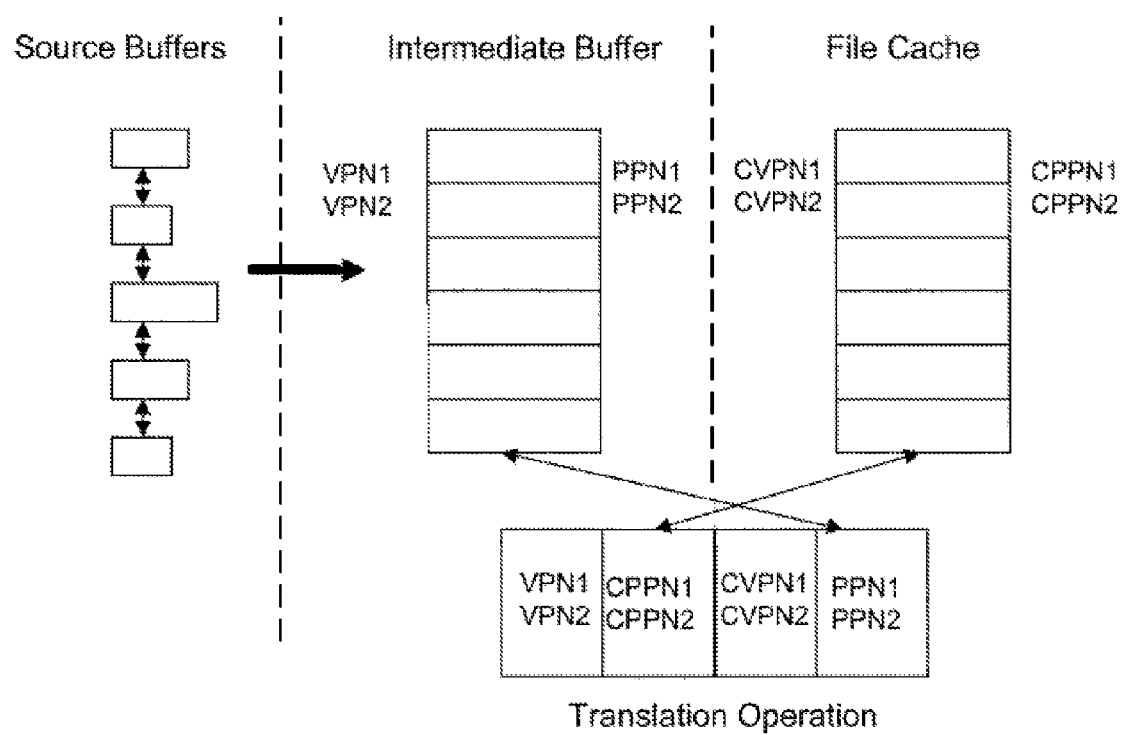
FIG. 5 is a process flow diagram showing a translation swapping operation between an intermediate buffer and file system cache, in accordance with an embodiment of the present invention.

At step 408 inode lock is acquired and the intermediate buffer 305 is passed to the file system layer with an instruction to perform a translation operation, as opposed to a straight copy via a flag. With reference to FIG. 5, the translation swapping operation is carried out by the processing module and involves exchanging the physical pages mapped to the source kernel address range (i.e. pages associated with the intermediate buffer 305) with a destination kernel address range (i.e. pages associated with the file system buffer cache 310), under the control of the kernel. In this manner the number of copy operations in the write process is reduced to one guaranteed page trade, thereby providing an improved file system write concurrency and file system throughput in contrast to techniques which carry out the copy operation after inode lock has been acquired.

FIGS. 6a and 6b are throughput tables generated by the IOzone Filesystem Benchmark tool (available on the Internet at http://www.iozone.org/) contrasting the write throughput when running a single write process on the server 102 with a 2 GB file using conventional techniques (i.e. copying data held in source buffer to file system buffer cache after acquiring write lock —FIG. 6a) and using the method of the embodiment described herein (FIG. 6b). As can be seen, when running the process in accordance with conventional techniques a write throughput of approximately 14.5 MB/sec is achieved, whereas running the same file implementing the processing technique of the present invention, a throughput of 46.5 MB/sec is realised, more than tripling the write throughput.

Those of ordinary skill will appreciate that the hardware provided in the server may vary depending on the implementation. Other internal hardware may be used in addition to, or in place of, the hardware depicted in FIGS. 1 & 2. For example, included may be additional memory controllers, hard disks, tape storage devices, etc. Furthermore, it should be readily understood that an embodiment of the present invention may be implemented on a stand-alone computing system, such as personal computing system, and need not be limited to the client-server architecture illustrated in FIGS. 1 & 2.

Furthermore, it will be understood by persons skilled in the art that the invention may be implemented in a stand alone computing device or in a distributed, networked configuration. For example, the present invention may be implemented solely or in combination in a client computing device, server computing device, personal computing device etc.

The foregoing description of the exemplary embodiments is provided to enable any person skilled in the art to make or use the present invention. While the invention has been described with respect to particular illustrated embodiments, various modifications to these embodiments will be readily apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is accorded the wider scope consistent with the principles and novel features disclosed herein.

The invention claimed is:

1. A method for processing concurrent write operations in a computer system, the method comprising the steps of:
   copying data residing in one or more source buffers to a contiguous intermediate buffer, prior to acquiring a lock for a write operation;
   on acquiring the lock, performing a translation operation between the intermediate buffer and a destination buffer to process the write operation; and
   executing a concurrent write operation based on said translation operation.

2. A method in accordance with claim 1, wherein the translation operation is a page trading operation.

3. A method in accordance with claim 1, wherein the method comprises the further step of locating the intermediate buffer in an upper file layer of the computer system.

4. A method in accordance with claim 3, wherein for a write operation, the intermediate buffer is located in a system call layer.

5. A method in accordance with claim 3, wherein for a network file system write operation, the intermediate buffer is located in a network file system layer.

6. A method in accordance with claim 1, comprising the further step of locating the destination buffer in a physical file system layer of the computing system.

7. A method in accordance with claim 6, wherein the destination buffer is located in a file system buffer cache.

8. A method in accordance with claim 1, wherein the translation operation is carried out by a kernel of the computing system.

9. A method in accordance with claim 1, wherein the lock for write operation is an inode lock.

10. A method in accordance with claim 1, wherein the step of performing a translation operation comprises the further step of exchanging at least one page mapped to a source kernel address range associated with the intermediate buffer, with a destination kernel address range associated with the destination buffer.

11. A computer readable storage medium provided with program data that, when executed on a computing system causes said computing system to process concurrent write operations, comprising the steps of:
   copying data residing in one or more source buffers to a contiguous intermediate buffer, prior to acquiring a lock for a write operation;
   on acquiring the lock, performing a translation operation between the intermediate buffer and a destination buffer to process the write operation; and
   executing the concurrent write operation based on said translation operation.

12. A computer program for processing concurrent write operations in a computing system and comprising at least one instruction which, when executed on a computer readable medium of the computing system, causes the computing system to perform the steps of:
   copying data residing in one or more source buffers to a contiguous intermediate buffer, prior to acquiring a lock for a write operation;
   on acquiring the lock, performing a translation operation between the intermediate buffer and a destination buffer, to process the write operation; and
   executing the concurrent write operation based on said translation operation.

13. A computing system, comprising:
   a copy device configured to copy data residing in one or more source buffers to a contiguous intermediate buffer, prior to acquiring a lock for a write operation;
   a processing arrangement configured to, on acquiring the lock, performing a translation operation between the intermediate buffer and a destination buffer, to process the write operation; and
   executing the concurrent write operation based on said translation operation.

14. A computing system in accordance with claim 13, wherein the translation operating is a page trading operation.

15. A computing system in accordance with claim 13, wherein the intermediate buffer is located in an upper file layer of the computer system.

16. A computing system in accordance with claim 15, wherein for a write operation, the intermediate buffer is located in a system call layer.

17. A computing system in accordance with claim 15, wherein for a network file system write operation, the intermediate buffer is located in a network file system layer.

18. A computing system in accordance with claim 13, wherein the destination buffer is located in a physical file system layer of the computing system.

19. A computing system in accordance with claim 18, wherein the destination buffer is located in a file system buffer cache.

20. A computing system in accordance with claim 13, further comprising a kernel configured to carry out the translation operation.

21. A computing system in accordance with claim 13, wherein the lock for write operation is an inode lock.

22. A computing system in accordance with claim 13, wherein the step of performing a translation operation comprises the further step of exchanging at least one page mapped to a source kernel address range associated with the intermediate buffer, with a destination kernel address range associated with the destination buffer.

* * * * *